US006668590B2

(12) United States Patent
Lewandowski

(10) Patent No.: US 6,668,590 B2
(45) Date of Patent: Dec. 30, 2003

(54) FORCED CONVECTION HEATING FURNACE AND METHOD FOR HEATING GLASS SHEETS

(75) Inventor: Troy R. Lewandowski, Maumee, OH (US)

(73) Assignee: Glasstech, Inc., Perrysburg, OH (US)

( * ) Notice: Subject to any disclaimer, the term of this patent is extended or adjusted under 35 U.S.C. 154(b) by 185 days.

(21) Appl. No.: 10/001,564

(22) Filed: Oct. 23, 2001

(65) Prior Publication Data

US 2003/0074922 A1 Apr. 24, 2003

(51) Int. Cl.[7] ............................................... C03B 25/08
(52) U.S. Cl. .............................. 65/111; 65/119; 65/268; 65/273
(58) Field of Search ......................... 65/111, 273, 119, 65/268, 114–118; 432/136, 143, 144, 145, 146, 148, 176

(56) References Cited

U.S. PATENT DOCUMENTS

| 3,048,383 A | * | 8/1962 | Champlin | 266/111 |
| 3,637,362 A | * | 1/1972 | Oelke et al. | 65/25.2 |
| 5,110,338 A | * | 5/1992 | McMaster | 65/182.2 |
| 5,150,534 A | * | 9/1992 | Kramer | 34/638 |
| 5,209,767 A | * | 5/1993 | Maltby et al. | 65/182.2 |
| 5,669,954 A | | 9/1997 | Kormanyos | |
| 5,672,191 A | | 9/1997 | Kormanyos | |
| 5,735,924 A | | 4/1998 | Kormanyos | |
| 5,746,799 A | | 5/1998 | Kormanyos | |
| 5,762,677 A | | 6/1998 | Kormanyos | |
| 5,792,232 A | | 8/1998 | Kormanyos | |
| 6,019,593 A | | 2/2000 | Lewandowski et al. | |
| 6,045,358 A | | 4/2000 | Kormanyos | |
| 6,050,814 A | | 4/2000 | Lewandowski | |
| 6,131,411 A | * | 10/2000 | Schnabel, Jr. | 65/111 |
| 6,155,822 A | | 12/2000 | Lewandowski | |

* cited by examiner

Primary Examiner—Sean Vincent
(74) Attorney, Agent, or Firm—Brooks Kushman P.C.

(57) ABSTRACT

A furnace (10) and method for heating conveyed glass sheets within a housing (12) includes forced convection heaters (24) spaced along the direction of conveyance both below and above a roll conveyor (20). Each forced convection heater (24) includes a gas burner assembly (32) generally adjacent one of the housing side walls and has an outlet (34) through which products of combustion are supplied to the housing heating chamber (18) at a location intermediate its side walls. A hot gas distributor (38) of each forced convection heater (24) includes an inlet (40) that is spaced from the outlet (34) of the gas burner assembly (32), and the hot gas distributor (38) has a suction fan (42) for drawing in heated products of combustion together with spent recirculating gas in the heating chamber (18) for mixing to provide heated gas that is distributed to the conveyed glass sheets.

16 Claims, 6 Drawing Sheets

FORCED CONVECTION HEATING FURNACE AND METHOD FOR HEATING GLASS SHEETS

BACKGROUND OF THE INVENTION

1. Field of the Invention

This invention relates to a forced convection heating furnace for heating glass sheets and also relates to a method for heating glass sheets.

2. Background Art

Forced convection furnaces are used to heat glass sheets in preparation for processing such as forming, tempering, heat strengthening, annealing, and coating, etc. Such prior art forced convection furnaces for heating glass sheets are disclosed by the United States patents of Kenneth R. Kormanyos: U.S. Pat. Nos. 5,669,954; 5,672,191; 5,735,924; 5,746,799; 5,762,677; 5,792,232; and 6,045,358. In the Kormanyos patents, the glass sheets are conveyed on a roll conveyor during the heating which is performed by lower and upper sets of hot gas hot gas distributor heads that supply upwardly and downwardly directed pressurized hot gas flows to the lower and upper surfaces of the conveyed glass sheets. An associated lower hot gas distributor head is located between each pair of adjacent conveyor rolls, such that the spent quenching gas must flow downwardly between the conveyor rolls and the hot gas distributor head. Furthermore, any broken glass that is lodged between the conveyor rolls and the lower hot gas distributor heads must be removed before commencing further heating of the glass sheets.

The United States patents of Troy R. Lewandowski U.S. Pat. Nos. 6,050,814 and 6,155,822 disclose forced convection heating of glass sheets conveyed on a roll conveyor wherein lower hot gas distributor heads provide upwardly directed hot gas flows both upstream and downstream of alternate conveyor rolls in a manner that provides sufficient room for the spent gas flows to move downwardly after impingement with the glass sheet being heated.

In both the above mentioned Kormanyos and Lewandowski patents, the heated gas is supplied by mixing spent recirculating gas with the heated products of combustion from gas burners mounted on one side wall of the furnace, such that the spent recirculating gas flows to the one side wall. Within the furnace heating chamber, the temperature can be lower adjacent the side wall to which the spent recirculating gas flows because it has a lower temperature than the heated gas upon distribution prior to the impingement with the conveyed glass sheets.

SUMMARY OF THE INVENTION

An object of the present invention is to provide an improved furnace for heating glass sheets.

In carrying out the above object, the furnace for heating glass sheets in accordance with the invention includes a housing having a pair of side walls, a floor and a ceiling that cooperate to define a heating chamber. A roll conveyor of the furnace conveys glass sheets through the heating chamber along a direction of conveyance. A forced convection heater of the furnace is located within the housing and includes a gas burner assembly generally adjacent one of the housing side walls. The gas burner assembly includes an outlet through which heated products of combustion from the gas burner assembly are supplied to the heating chamber at a location intermediate the housing side walls. The forced convection heater also includes a hot gas distributor located within the housing generally adjacent the other side wall and including an inlet that is spaced from the outlet of the gas burner assembly intermediate the housing side walls. The hot gas distributor has a suction fan for drawing the heated products of combustion from the outlet of the gas burner assembly together with spent quenching gas in the heating chamber into the hot gas distributor through its inlet for mixing to provide heated gas. The hot gas distributor also has distribution openings through which the mixed heated gas is distributed to the conveyed glass sheets on the roll conveyor to provide heating of the glass sheets.

The construction of the furnace and its forced convection heater provides a generally uniform temperature in the heating chamber between the housing side walls. More specifically, the actual construction of the furnace includes a plurality of the forced convection heaters positioned along the direction of conveyance both below and above the roll conveyor to provide upwardly and downwardly directed heated gas flows to the conveyed glass sheets on the roll conveyor to provide the heating of the glass sheets.

The furnace preferably has the midpoint between the side walls of the housing located between the outlet of the gas burner assembly and the inlet of the hot gas distributor. A delivery tube of the gas burner assembly has an outer end mounted by the one side wall and the gas burner assembly has a gas burner mounted by the one side wall within the delivery tube adjacent its mounted outer end. An inner end of the delivery tube defines the outlet of the gas burner assembly through which the heated products of combustion from the gas burner are supplied with, as mentioned above, a midpoint between the side walls of the housing being located between the outlet of the gas burner assembly and the inlet of the hot gas distributor.

The outlet of the gas burner assembly in one construction includes an adjustable damper for controlling the flow of heated products of combustion into the heating chamber.

In another construction, the gas burner assembly includes a delivery tube, the gas burner assembly has a gas burner that is received within the delivery tube, the delivery tube includes an inner end defining the outlet of the gas burner assembly, the delivery tube includes openings through which a portion of the heated products of combustion from the gas burner flow outwardly without passing through the outlet at the inner end of the delivery tube, and the outlet of the gas burner assembly includes a damper that is adjustable to control the relative amounts of the heated products of combustion that flow through the openings of the delivery tube and through the outlet at the inner end of the delivery tube. This embodiment of the furnace also includes an enclosure in which the delivery tube with the gas burner therein is received. The inner end of the delivery tube opens outwardly through the enclosure into the heating chamber adjacent the inlet of the hot gas distributor. The enclosure has openings through which the heated products of combustion that pass outwardly through the openings of the delivery tube can pass outwardly from the enclosure into the heating chamber. This embodiment also has the outlet of the gas burner assembly including the damper that is adjustable to control the relative amounts of the heated products of combustion that flow through the openings of the delivery tube and through the outlet at the inner end of the delivery tube and also has the midpoint between the side walls of the housing located between the outlet of the gas burner assembly and the inlet of the hot gas distributor.

Another object of the present invention is to provide an improved method for heating glass sheets.

In carrying out the immediately preceding object, the method for heating glass sheets in accordance with the invention is performed by conveying glass sheets on a roll conveyor along a direction of conveyance within a heating chamber cooperatively defined by side walls, a floor and a ceiling of a housing. Heated products of combustion are supplied from a gas burner assembly mounted adjacent one side wall of the housing through an outlet of the gas burner assembly into the heated chamber at a location intermediate the housing side walls. The heated products of combustion are drawn from the outlet of the gas burner assembly together with spent recirculating gas in the heating chamber into a hot gas distributor through an inlet thereof for mixing to provide heated gas. The mixed heated gas is distributed to the conveyed glass sheets on the roll conveyor to provide heating of the glass sheets.

The method for heating glass sheets in accordance with the invention is actually performed with the heated products of combustion supplied from a plurality of gas burner assemblies spaced along the direction of conveyance both above and below the roll conveyor. The heated products of combustion along with spent recirculating gas are drawn from the outlets of the gas burner assemblies into inlets of associated hot gas distributors spaced along the direction of conveyance both below and above the roll conveyor for mixing to provide heated gas. This mixed heated gas is distributed both upwardly and downwardly to the conveyed glass sheets on the roll conveyor to provide heating of the glass sheets.

The method for heating glass sheets has the heated products of combustion preferably supplied from the outlet of the gas burner assembly to the heating chamber at a midpoint between the side walls of the housing.

The glass sheet heating method may also use an adjustable damper to control the flow of heated products of combustion through the outlet of the gas burner assembly.

The objects, features and advantages of the present invention are readily apparent from the following detailed description of the invention when taken in connection with the accompanying drawings.

DETAILED DESCRIPTION OF THE PREFERRED EMBODIMENTS

Figure 1:
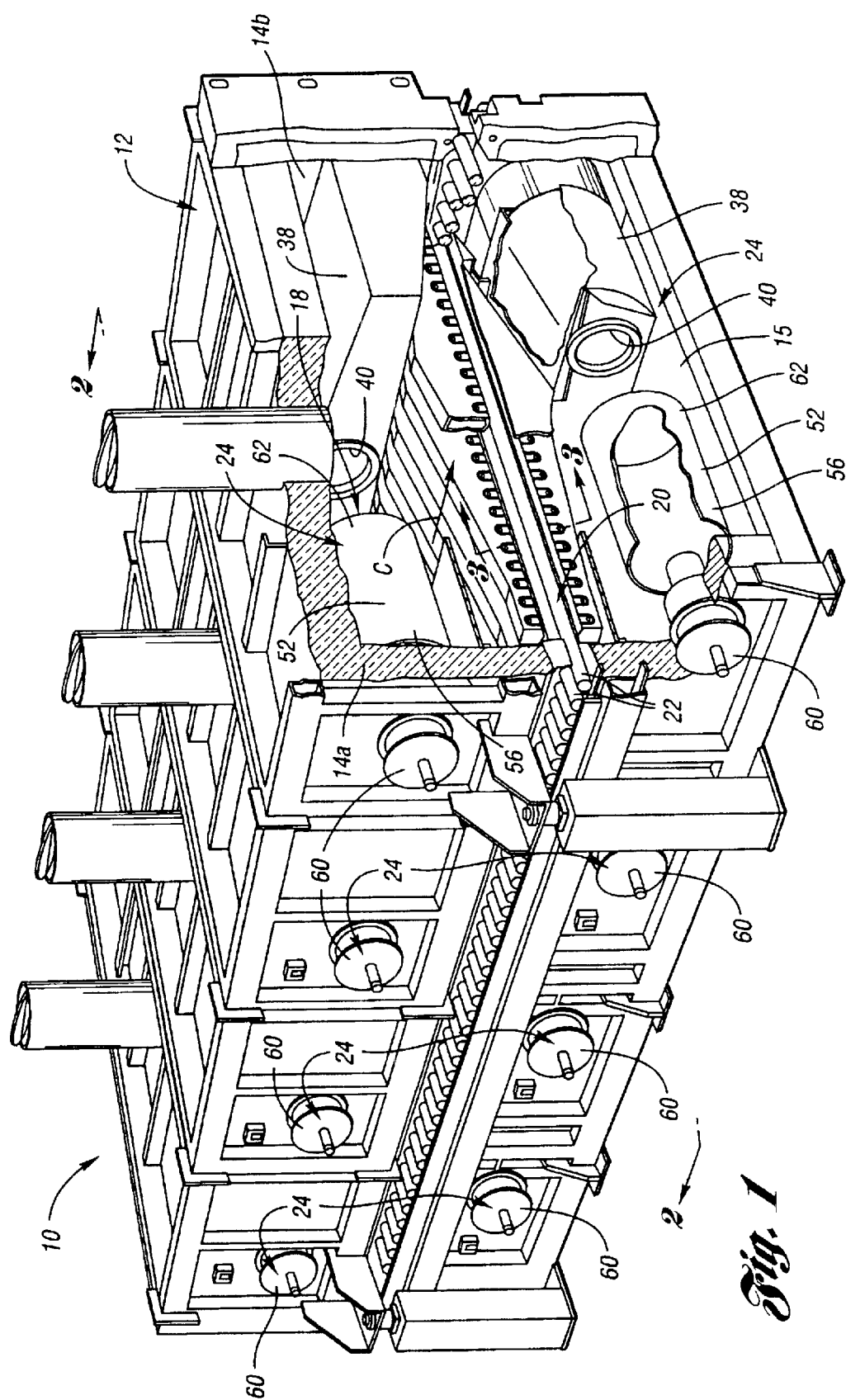
FIG. 1 is a perspective view that is partially broken away through a furnace constructed to heat glass sheets in accordance with the invention.

With reference to FIG. 1, a furnace generally indicated by 10 is constructed in accordance with the invention to perform the glass sheet heating method of the invention as is hereinafter more fully described. Both the construction of the furnace 10 and its method of operation will be described in an integrated manner to facilitate an understanding of all aspects of the invention.

Figure 2:
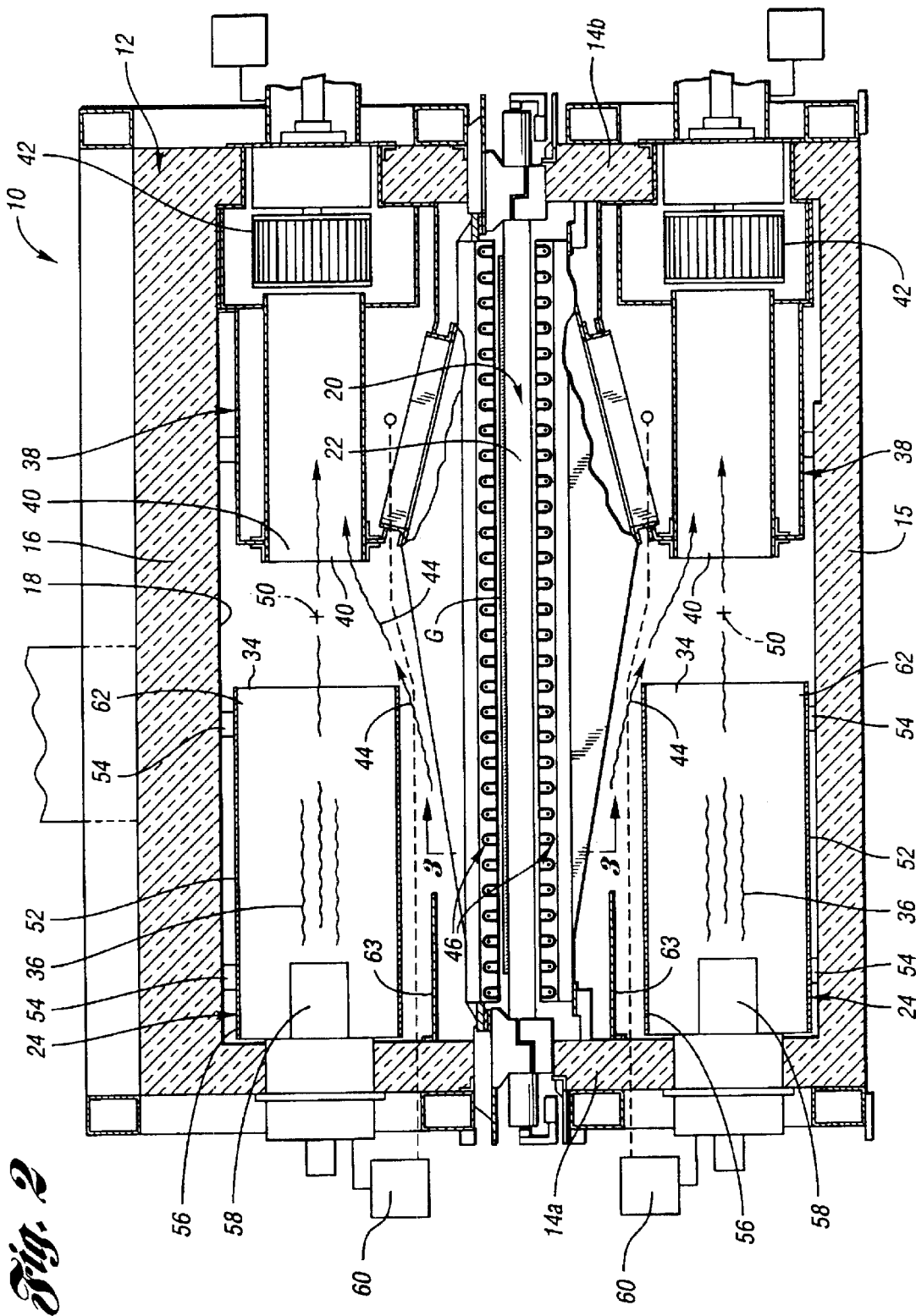
FIG. 2 is a sectional view taken through the furnace along the direction of line 2—2 in FIG. 1.

With continuing reference to FIG. 1 and to FIG. 2 as well, the furnace 10 includes a housing 12 having a pair of side walls $14_a$ and $14_b$, a floor 15, and a ceiling 16 that cooperate to define a heating chamber generally designed by 18. A roll conveyor of the furnace is generally indicated by 20 and includes a plurality of rolls 22 that convey glass sheets G (FIG. 2) along a direction of conveyance shown by arrow C in FIG. 1. These conveyor rolls 22 are made of sinter bonded fused silica particles so as to have good resistance to thermal warpage.

Figure 3:
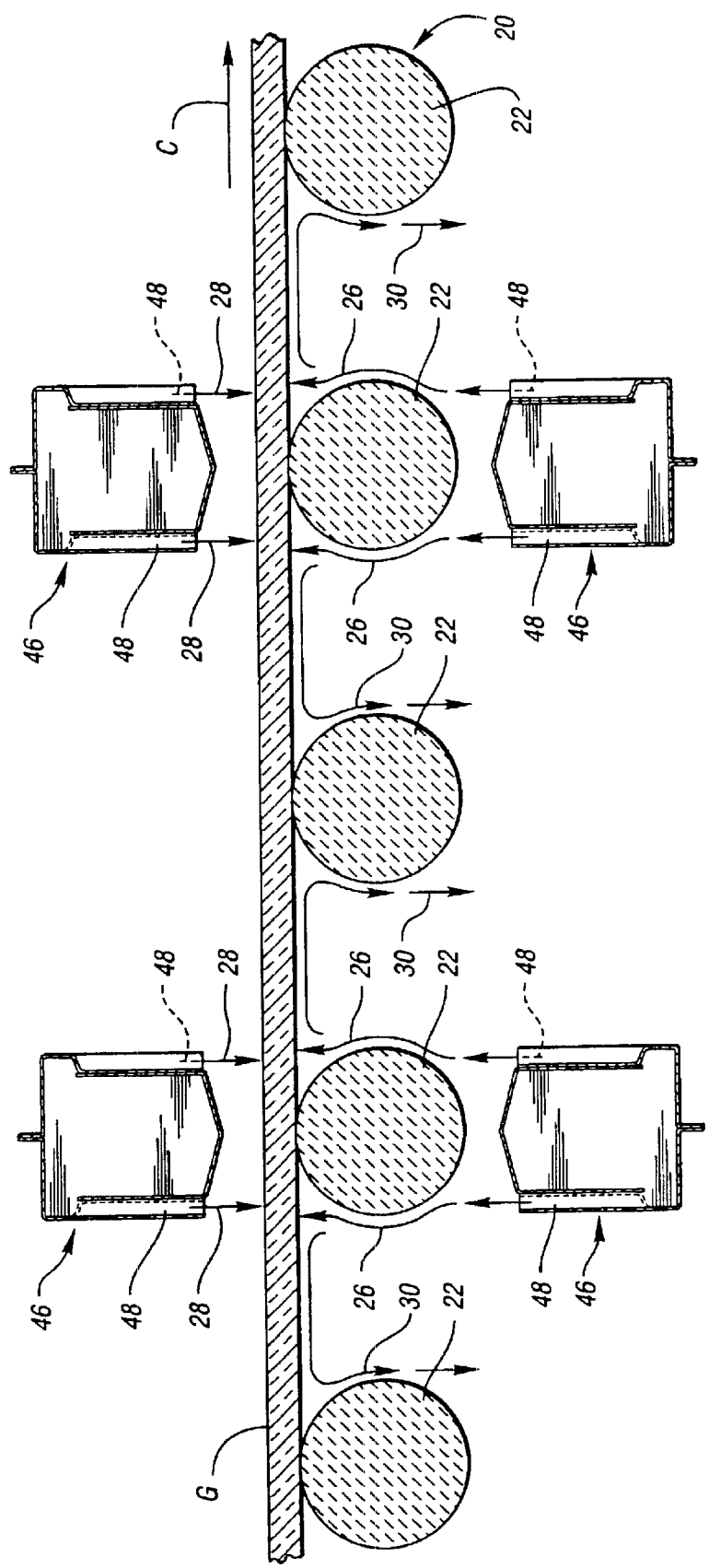
FIG. 3 is an elevational sectional view taken along the direction of line 3—3 in FIG. 2 to illustrate the manner in which upwardly and downwardly directed heated gas flows provide heating of conveyed glass sheets.
Figure 4:
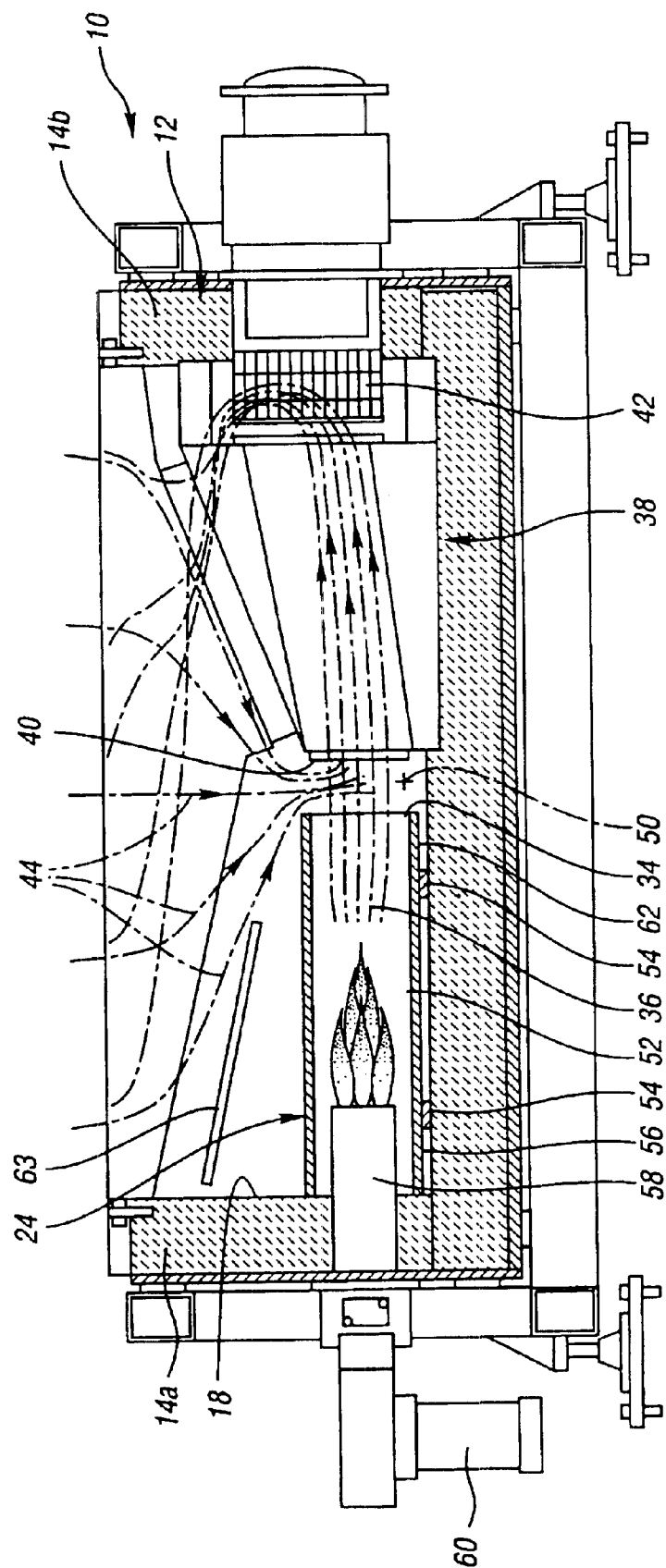
FIG. 4 is a partial view taken in the same direction as FIG. 2 to illustrate one embodiment of a forced convection heater of the furnace and the direction of gas flow during its operation at a lower location within the heating chamber of the furnace housing.

As illustrated by continuing reference to FIGS. 1 and 2, the furnace 10 includes forced convection heaters 24 positioned along the direction of conveyance both below and above the roll conveyor 20. These forced convection heaters provide upwardly and downwardly directed heated gas flows 26 and 28 as shown in FIG. 3 for heating the conveyed glass sheets. The upward gas flows are preferably provided in accordance with the teachings of the aforementioned U.S. Pat. No. 6,050,814 Lewandowski and U.S. Pat. No. 6,155,822 Lewandowski, the entire disclosures of which are hereby incorporated by reference, so as to be at both the upstream and downstream sides of alternate conveyor rolls 22 in order to provide adequate space for the gas flows after impingement with the glass sheet to flow downwardly for escape as indicated at 30. Likewise, the downward gas flows 28 are preferably provided in alignment with the upward gas flows to provide uniformity in the heating.

With reference back to FIGS. 1 and 2, each forced convection heater 24 is located within the housing and includes a gas burner assembly 32 generally adjacent one of the housing side walls $14_a$. The gas burner assembly 32 includes an outlet 34 through which the heated products of combustion from the gas burner assembly are supplied to the heating chamber 18 at a location intermediate the housing side walls $14_a$ and $14_b$. Each forced convection heater 24 also includes a hot gas distributor 38 located within the housing 12 adjacent the other side wall $14_b$ and including an inlet 40 that is spaced from the outlet 34 of the gas burner assembly 32 intermediate the side walls. The hot gas distributor 38 as shown in FIG. 2 has a suction fan 42 for drawing the heated products of combustion 36 from the outlet of the gas burner assembly together with spent recirculating gas 44 in the heating chamber into the hot gas distributor through its inlet 44 for mixing to provide heated gas. The hot gas distributor 38 has an associated distributor head 46 that extends laterally with respect to the roll conveyor across the direction of conveyance as best shown in FIG. 1. These distributor heads 46 have openings 48 through which the heated gas is distributed as previously described in connection with FIG. 3 to provide the upward and downward gas flows that provide heating of the conveyed glass sheets G.

The manner in which the cooler recirculating gas 44 flows generally to the lateral center of the heating chamber for the mixing with the heated products of combustion 36 provides a generally uniform temperature within the heating chamber between the housing side walls so as to facilitate heating of the glass sheets to a uniform temperature. More specifically as illustrated in FIG. 2, the midpoint 50 between the side walls 14$_a$ and 14$_b$ of the housing 12 is located between the outlet 34 of the gas burner assembly 32 and the inlet 40 of the hot gas distributor 38 which provides the central location at which the heated products of combustion 36 and the recirculating gas 44 meet in order to provide the uniformity in the temperature between the housing side walls.

As illustrated in FIG. 2, one embodiment of the gas burner assembly 32 includes a delivery tube 52 that is supported by one or more mounts 54 on the housing floor 15 or ceiling 16 in any suitable manner. An outer end 56 of the delivery tube 52 is located at the one housing side wall 14$_a$. The gas burner assembly 32 includes a gas burner 58 mounted by the one side wall 14$_a$ within the delivery tube 52 at its outer end 56. A burner control 60 of the type disclosed by U.S. Pat. No. 6,019,593 Lewandowski et al., the entire disclosure of which is hereby incorporated by reference, controls operation of the burner. An inner end 62 of the delivery tube 52 defines the outlet 34 of the gas burner assembly 32 through which the heated products of combustion 36 from the gas burner 58 are supplied. Upper and lower baffles 63 direct the recirculating gas 44 away from the delivery tubes 52 of the gas burners 32.

Figure 5:
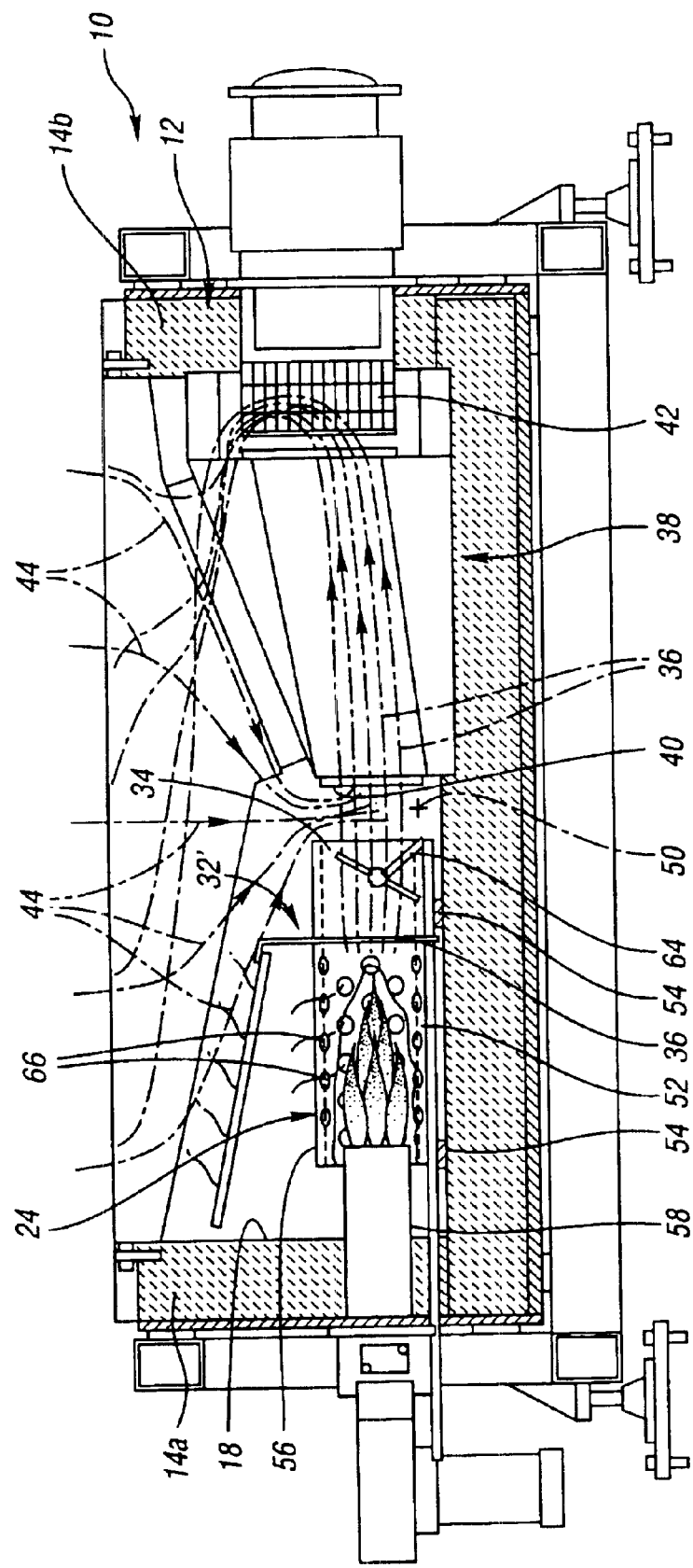
FIG. 5 is a partial sectional view similar to FIG. 4 but illustrating another embodiment of the forced convection heater whose gas burner assembly includes a perforated delivery tube and a perforated enclosure.
Figure 6:
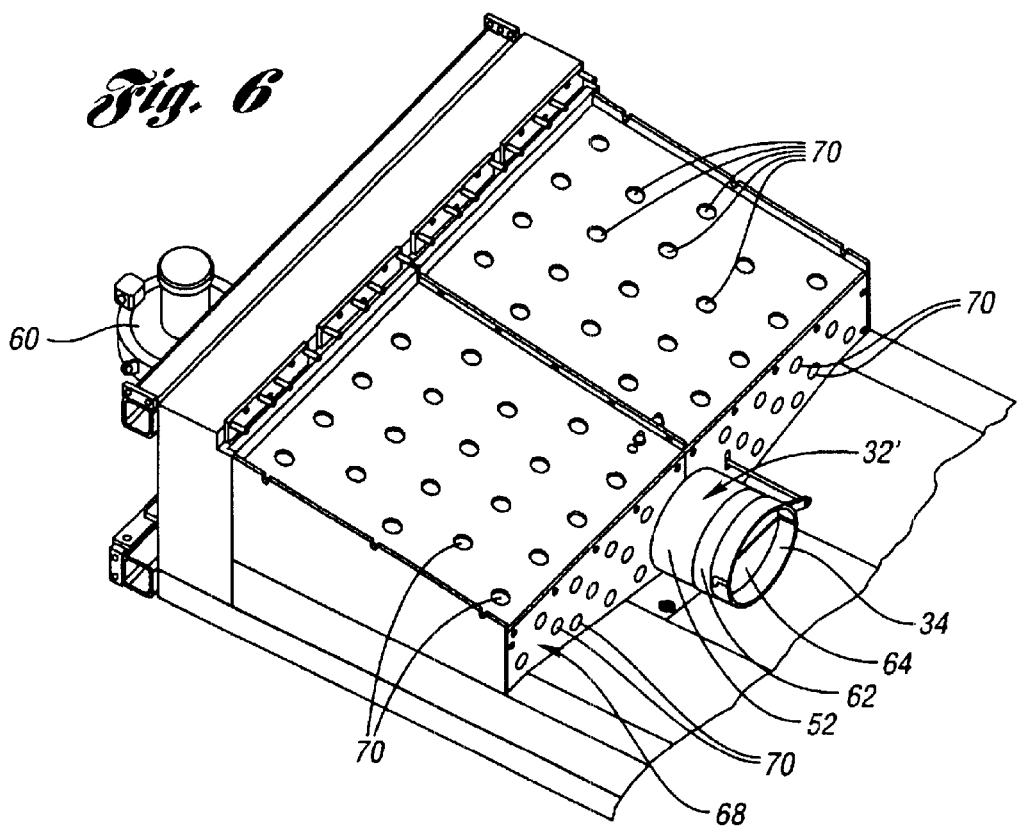
FIG. 6 is a perspective view of the gas burner assembly embodiment in FIG. 5 and illustrates its perforated enclosure.
Figure 7:
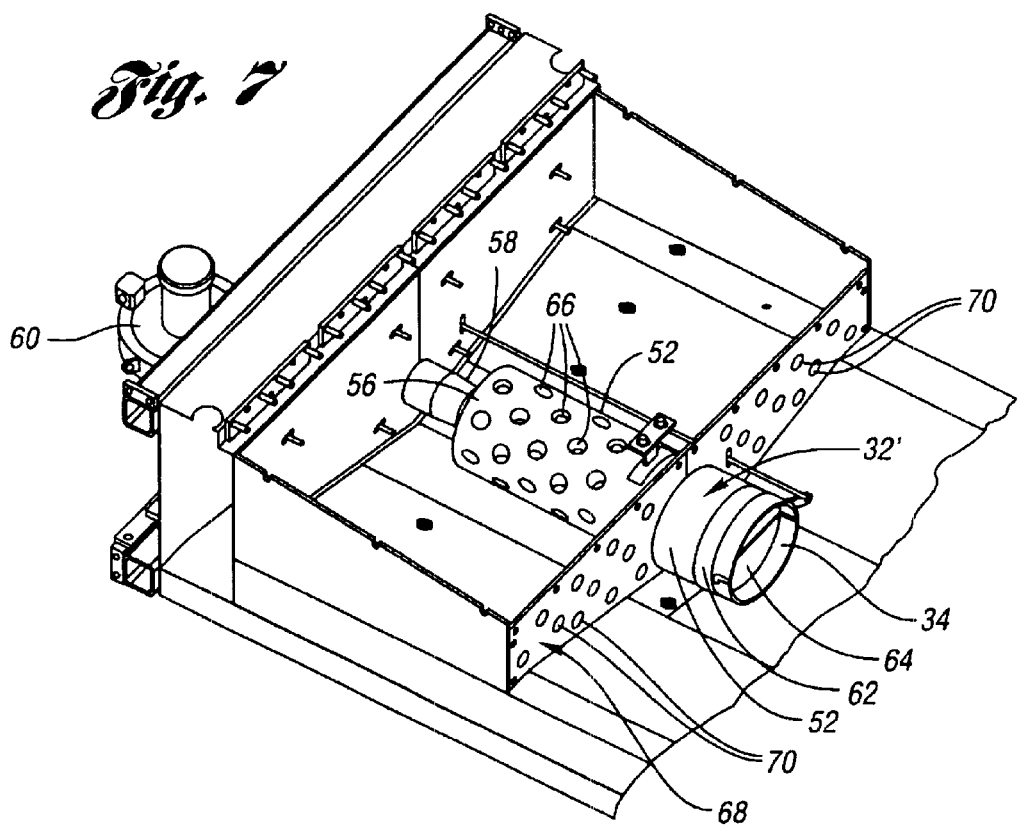
FIG. 7 is a perspective view similar to FIG. 6 with a portion of the perforated enclosure removed to illustrate the perforated delivery tube.

As illustrated in FIGS. 5–7, another embodiment of the gas burner assembly 32' includes an adjustable damper 64 for controlling the flow of the heated products of combustion into the heating chamber 18. In this embodiment, the gas burner assembly has the outer end 62 of the delivery tube 52 spaced from the housing side wall 14$_a$ with the gas burner 58 received within the delivery tube outer end. This delivery tube 52 includes openings 66 between its outer end 56 and its inner end 62 where the adjustable damper 64 is located at the outlet 34 of the gas burner assembly. A portion of the heated products of combustion 34 from the gas burner 58 flow outwardly through the openings 66 in the delivery tube 52 without passing through the outlet at the inner end 62 of the delivery tube. The extent of the heated products of combustion that flow through the openings 66 is controlled by the position of the adjustable damper 64. More specifically, closing of the damper 64 will provide more products of combustion that flow outwardly through the delivery tube openings 66 and opening of the damper will decrease the flow through the delivery tube openings. The position of the damper thus controls the extent of heated gas in the flow that is mixed by the hot gas distributor as previously described for flow to the conveyed glass sheets for heating.

The embodiment of FIGS. 5–7 also includes an enclosure 68 in which the delivery tube 52 is received. The inner end 62 of the delivery tube opens outwardly through the enclosure 68 into the heating chamber 18 adjacent the inlet 40 of the hot gas distributor 38. The enclosure 68 has openings 70 through which the heated products of combustion 34 that pass outwardly through the openings 66 of the delivery tube 52 can pass outwardly from the enclosure into the heating chamber. This flow permits heating of the heating chamber apart from the gas flow that is drawn into the hot gas distributor 38 for flow through the distributor head 46 as previously described to the conveyed glass sheets being heated.

While the preferred embodiments for carrying out the invention have been described in detail, those familiar with the art to which this invention relates will recognize various alternative designs and embodiments for practicing the invention as defined by the following claims.

What is claimed is:

1. A furnace for heating glass sheets comprising:
 a housing having a pair of side walls, a floor and a ceiling that cooperate to define a heating chamber;
 a roll conveyor for conveying glass sheets through the heating chamber along a direction of conveyance;
 a forced convection heater located within the housing and including a gas burner assembly generally adjacent one of the housing side walls, and the gas burner assembly including an outlet through which heated products of combustion from the gas burner assembly are supplied to the heating chamber at a location intermediate the housing side walls; and
 the forced convection heater also including a hot gas distributor located within the housing generally adjacent the other side wall and including an inlet that is spaced from the outlet of the gas burner assembly intermediate the housing side walls, the hot gas distributor having a suction fan for drawing the heated products of combustion from the outlet of the gas burner assembly together with spent recirculating gas in the heating chamber into the hot gas distributor through its inlet for mixing to provide heated gas, and the hot gas distributor having distribution openings through which the mixed heated gas is distributed to the conveyed glass sheets on the roll conveyor to provide heating of the glass sheets.

2. A furnace for heating glass sheets as in claim 1 which included a plurality of the forced convection heaters positioned along the direction of conveyance both below and above the roll conveyor to provide upwardly and downwardly directed heated gas flows to the conveyed glass sheets on the roll conveyor to provide the heating of the glass sheets.

3. A furnace for heating glass sheets as in claim 1 wherein the midpoint between the side walls of the housing is located between the outlet of the gas burner assembly and the inlet of the hot gas distributor.

4. A furnace for heating glass sheets as in claim 1 wherein the gas burner assembly includes a delivery tube having an outer end mounted by the one side wall, the gas burner assembly having a gas burner mounted by the one side wall within the delivery tube adjacent its mounted outer end, and the delivery tube having an inner end that defines the outlet of the gas burner assembly through which the heated products of combustion from the gas burner are supplied.

5. A furnace for heating glass sheets as in claim 1 wherein the gas burner assembly includes a delivery tube having an outer end mounted by the one side wall, the gas burner assembly having a gas burner mounted by the one side wall within the delivery tube adjacent its mounted outer end, the delivery tube having an inner end that defines the outlet of the gas burner assembly through which the heated products of combustion from the gas burner are supplied, and the midpoint between the side walls of the housing being located between the outlet of the gas burner assembly and the inlet of the hot gas distributor.

6. A furnace for heating glass sheets as in claim 1 wherein the outlet of the gas burner assembly includes an adjustable damper for controlling the flow of the heated products of combustion into the heating chamber.

7. A furnace for heating glass sheets as in claim 1 wherein the gas burner assembly includes a delivery tube, the gas burner assembly having gas burner that is received within the delivery tube, the delivery tube including an inner end defining the outlet of the gas burner assembly, the delivery tube including openings through which a portion of the heated products of combustion from the gas burner flow outwardly without passing through the outlet at the inner end of the delivery tube, and the outlet of the gas burner assembly including a damper that is adjustable to control the relative amounts of the heated products of combustion that flow through the openings of the delivery tube and through the outlet at the inner end of the delivery tube.

8. A furnace for heating glass sheets as in claim 7 further including an enclosure in which the delivery tube with the gas burner therein is received, the inner end of the delivery tube opening outwardly through the enclosure into the heating chamber adjacent the inlet of the hot gas distributor, and the enclosure having openings through which the heated products of combustion that pass outwardly through the openings of the delivery tube can pass outwardly from the enclosure into the heating chamber.

9. A furnace for heating glass sheets as in claim 1 wherein the gas burner assembly includes a delivery tube, the gas burner assembly having gas burner that is received within the delivery tube, the delivery tube having an inner end defining the outlet of the gas burner assembly, the delivery tube including openings through which a portion of the heated products of combustion from the gas burner flow outwardly without passing through the outlet at the inner end of the delivery tube, the outlet of the gas burner assembly including a damper that is adjustable to control the relative amounts of the heated products of combustion that flow through the openings of the delivery tube and through the outlet at the inner end of the delivery tube, an enclosure in which the delivery tube with the gas burner therein is received, the inner end of the delivery tube opening outwardly through the enclosure into the heating chamber adjacent the inlet of the hot gas distributor, the enclosure having openings through which the heated products of combustion that pass outwardly through the openings of the delivery tube can pass outwardly from the enclosure into the heating chamber, and the midpoint between the side walls of the housing being located between the outlet of the gas burner assembly and the inlet of the hot gas distributor.

10. A furnace for heating glass sheets comprising:
a housing having a pair of side walls, a floor and a ceiling that cooperate to defined a heating chamber;
a roll conveyor for conveying glass sheets through the heating chamber along a direction of conveyance;
a plurality of forced convection heaters spaced along the direction of conveyance both below and above the roll conveyor within the housing, each forced convection heater including a gas burner assembly generally adjacent one of the housing side walls, the gas burner assembly including a delivery tube having an outer end and a gas burner mounted by the one side wall within the outer end of the delivery tube, and the delivery tube having an inner end that defines an outlet of the gas burner assembly through which heated products of combustion from the gas burner are supplied to the heating chamber at a location intermediate the housing side walls; and
each forced convection heater also including a hot gas distributor located within the housing generally adjacent the other side wall and including an inlet that is spaced from the outlet of its gas burner assembly intermediate the housing side walls, the hot gas distributor having a suction fan for drawing the heated products of combustion from the outlet of the gas burner assembly together with spent recirculating gas in the heating chamber into the hot gas distributor through its inlet for mixing to provide heated gas, and the hot gas distributor having distribution openings through which the mixed heated gas is distributed to the conveyed glass sheets on the roll conveyor to provide heating of the glass sheets.

11. A furnace for heating glass sheets comprising:
a housing having a pair of side walls, a floor and a ceiling that cooperate to define a heating chamber;
a roll conveyor for conveying glass sheets through the heating chamber along a direction of conveyance;
a plurality of forced convection heaters spaced along the direction of conveyance both below and above the roll conveyor within the housing, each forced convection heater including a gas burner assembly generally adjacent one of the housing side walls, the gas burner assembly including a delivery tube having an outer end and a gas burner mounted by the one side wall within the outer end of the delivery tube, the delivery tube having an inner end that defines an outlet of the gas burner assembly through which heated products of combustion from the gas burner are supplied to the heating chamber at a location intermediate the housing side walls, the outlet of each gas burner assembly including an adjustable damper at the inner end of the delivery tube for controlling the flow of the heated products of combustion into the heating chamber; and
each forced convection heater also including a hot gas distributor located within the housing generally adjacent the other side wall and including an inlet that is spaced from the outlet of its gas burner assembly intermediate the housing side walls, the hot gas distributor having a suction fan for drawing the heated products of combustion from the outlet of the gas burner assembly together with spent recirculating gas in the heating chamber into the hot gas distributor through its inlet for mixing to provide heated gas, and the hot gas distributor having distribution openings through which the mixed heated gas is distributed to the conveyed glass sheets on the roll conveyor to provide heating of the glass sheets.

12. A method for heating glass sheets comprising:
conveying glass sheets on a roll conveyor along a direction of conveyance within a heating chamber cooperatively defined by side walls, a floor and a ceiling of a housing;
supplying heated products of combustion from a gas burner assembly mounted adjacent one side wall of the housing through an outlet of the gas burner assembly into the heating chamber at a location intermediate the housing side walls;
drawing the heated products of combustion from the outlet of the gas burner assembly together with spent recirculating gas in the heating chamber into a hot gas distributor through an inlet thereof for mixing to provide heated gas; and
distributing the mixed heated gas to the conveyed glass sheets on the roll conveyor to provide heating of the glass sheets.

13. A method for heating glass sheets as in claim 12 wherein the heated products of combustion are supplied from a plurality of gas burner assemblies spaced along the direction of conveyance both above and below the roll conveyor, the heated products of combustion along with spent recirculating gas being drawn from the outlets of the gas burner assemblies into inlets of associated hot gas distributors spaced along the direction of conveyance both below and above the roll conveyor for mixing to provide heated gas, and the mixed heated gas being distributed both upwardly and downwardly to the conveyed glass sheets on the roll conveyor to provide heating of the glass sheets.

14. A method for heating glass sheets as in claim 12 wherein the heated products of combustion are supplied from the outlet of the gas burner assembly to the heating chamber at a midpoint between the side walls of the housing.

15. A method for heating glass sheets as in claim 12 wherein an adjustable damper controls the flow of the heated products of combustion through the outlet of the gas burner assembly.

16. A method for heating glass sheets comprising:

conveying glass sheets on a roll conveyor along a direction of conveyance within a heating chamber cooperatively defined by side walls, a floor and a ceiling of a housing;

burning gas in a plurality of gas burners to provide heated products of combustion within associated delivery tubes of a plurality gas burner assemblies spaced along the direction of conveyance both above and below the roll conveyor;

supplying the heated products of combustion through outlets of the gas burner assemblies with the outlets provided by an inner ends of the delivery tubes for flow into the heating chamber at a location intermediate the housing side walls;

drawing the heated products of combustion from the outlets of the gas burner assemblies together with spent recirculating gas in the heating chamber into inlets of hot gas distributors spaced along the direction of conveyance both below and above the roll conveyor through an inlet thereof for mixing to provide heated gas;

mixing the heated products of combustion and the spent recirculating gas from the heating chamber within the hot gas distributors to provide mixed heated gas; and distributing the mixed heated gas upwardly and downwardly to the conveyed glass sheets on the roll conveyor to provide heating of the glass sheets.

* * * * *